US008672310B2

(12) United States Patent
O'Rell et al.

(10) Patent No.: US 8,672,310 B2
(45) Date of Patent: Mar. 18, 2014

(54) WORK HOLDER

(75) Inventors: Brian T. O'Rell, Simi Valley, CA (US); Dao Ha, Burbank, CA (US)

(73) Assignee: Raptor Workholding Products, Inc., Burbank, CA (US)

( * ) Notice: Subject to any disclaimer, the term of this patent is extended or adjusted under 35 U.S.C. 154(b) by 912 days.

(21) Appl. No.: 12/611,894

(22) Filed: Nov. 3, 2009

(65) Prior Publication Data

US 2010/0219573 A1   Sep. 2, 2010

Related U.S. Application Data

(60) Provisional application No. 61/110,810, filed on Nov. 3, 2008.

(51) Int. Cl.
   *B25B 1/02*   (2006.01)
(52) U.S. Cl.
   USPC .......................................... 269/246
(58) Field of Classification Search
   USPC ............ 269/246, 160, 172, 189, 240, 254 CS
   See application file for complete search history.

(56) References Cited

U.S. PATENT DOCUMENTS

| | | | | |
|---|---|---|---|---|
| 565,425 | A * | 8/1896 | Bolte et al. | 211/22 |
| 790,479 | A * | 5/1905 | Carr et al. | 407/81 |
| 1,454,148 | A * | 5/1923 | Bisset | 279/123 |
| 4,221,391 | A * | 9/1980 | Dutton | 279/123 |
| 4,300,271 | A * | 11/1981 | Wohlhaupter | 384/7 |
| 4,577,846 | A * | 3/1986 | Buchler | 269/82 |
| 4,909,110 | A * | 3/1990 | Borzym | 83/319 |
| 5,019,129 | A * | 5/1991 | Johanson | 269/71 |
| 5,423,524 | A * | 6/1995 | Searle | 269/71 |
| 5,551,676 | A * | 9/1996 | Tibbet | 269/43 |
| 5,551,795 | A * | 9/1996 | Engibarov | 403/381 |
| 5,649,694 | A * | 7/1997 | Buck | 269/43 |
| 5,673,905 | A * | 10/1997 | Kiene | 269/238 |
| 6,174,102 | B1 * | 1/2001 | Do et al. | 403/381 |
| 6,350,080 | B1 * | 2/2002 | Do et al. | 403/381 |
| 6,598,867 | B2 * | 7/2003 | Martinez | 269/43 |
| 6,957,809 | B1 * | 10/2005 | Ferrara et al. | 269/283 |
| 7,182,327 | B1 * | 2/2007 | Ferrara | 269/224 |
| 7,712,401 | B1 * | 5/2010 | Greenwald | 82/112 |
| 8,113,497 | B2 * | 2/2012 | Kellerson | 269/45 |
| 8,181,949 | B2 * | 5/2012 | Hung | 269/244 |
| 2010/0052234 | A1 * | 3/2010 | Ryai, Sr. | 269/257 |
| 2010/0219573 | A1 * | 9/2010 | O'Rell et al. | 269/246 |

FOREIGN PATENT DOCUMENTS

JP        02100878 A  *  4/1990

* cited by examiner

*Primary Examiner* — Lee D Wilson
*Assistant Examiner* — Jamal Daniel
(74) *Attorney, Agent, or Firm* — Gregory B. Wood; Feldman Gale, P.A.

(57) ABSTRACT

A work holder which is adapted to hold a workpiece firmly in place for machining operations with respect to a machine tool. The workpiece is fashioned with a dovetail protuberance, which protuberance is designed to affix the workpiece to the work holder to the machining operations. Once the machining is completed, the dovetail protuberance may be removed in any convenient manner. Thus, the finished product may not then exhibit the former protuberance.

5 Claims, 7 Drawing Sheets

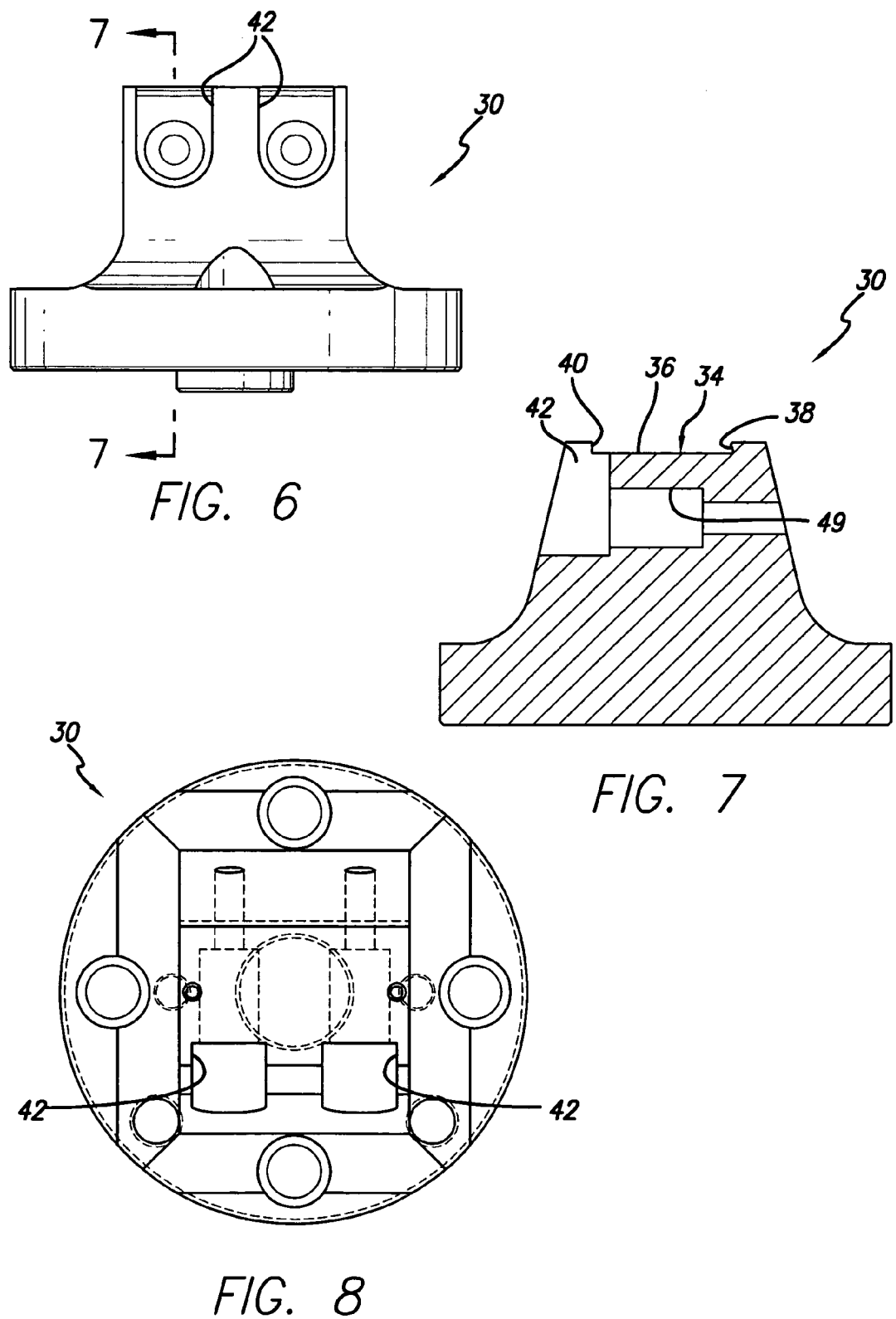

WORK HOLDER

CROSS-REFERENCE TO RELATED APPLICATION

The applicants claim the benefit of their provisional patent application, Ser. No. 61/110,810, filed Nov. 3, 2008.

REFERENCE REGARDING FEDERAL SPONSORSHIP

Not Applicable

REFERENCE TO MICROFICHE APPENDIX

Not Applicable

SUMMARY

The work holder is an intermediary dovetail fixture, which is adapted to hold a workpiece firmly in place for machining operations with respect to a machine tool, for example, a 5-axis vertical machining center, e.g, see www.matsuura-.co.jp. The workpiece is fashioned with a dovetail protuberance, which protuberance is designed to affix the workpiece to the work holder prior to the machining operations. Once the machining is completed, the dovetail protuberance is removed in any convenient manner, such as by being ground away. Thus, the finished product will not exhibit the former protuberance.

DRAWINGS

The attached illustrations depict the work holder, in which:

FIG. 6 is a view of the work holder taken 90° with respect to that shown in FIG. 5;

FIG. 7 is a cross-section of the work holder taken along section line 7-7 of FIG. 6;

FIG. 8 is a top view of the work holder as previously shown;

Figure 11:
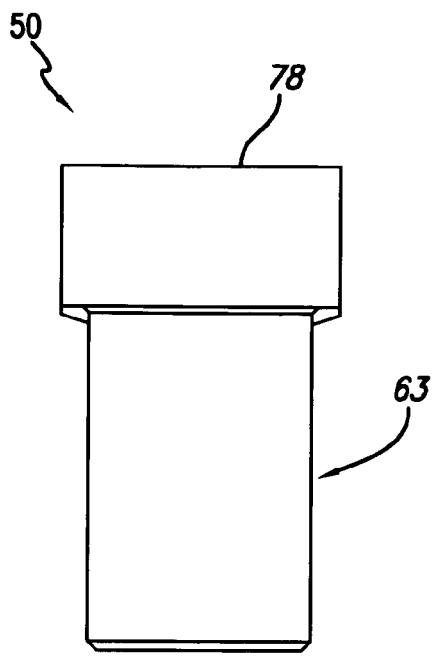
Figure 12:
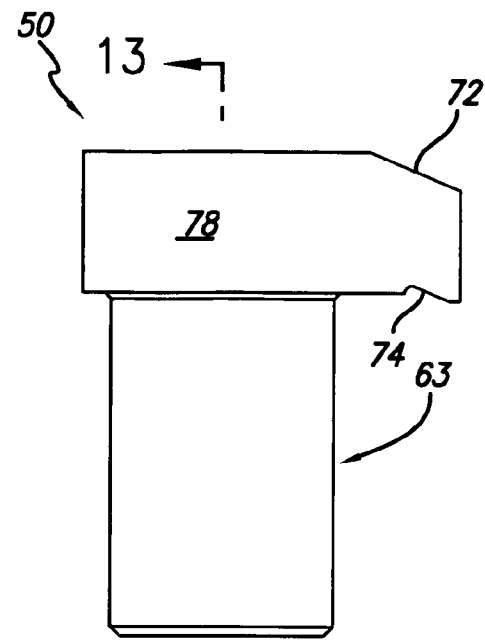
Figure 13:
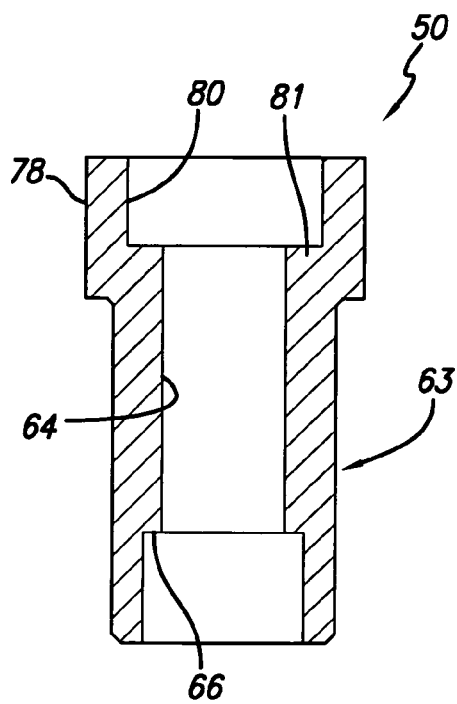
Figure 14:
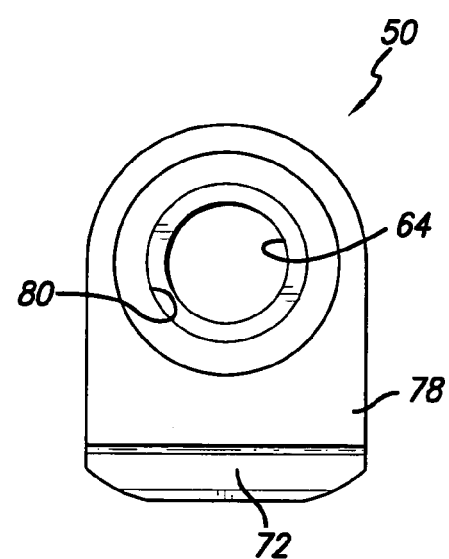

FIG. 11 a side view of one of the housings of the clamps used in the work holder used to grip the dovetail of the workpiece;

FIG. 12 is a side view of the swing clamp housing shown in FIG. 11, but turned 90° therefrom;

FIG. 13 is a cross-sectional view of the clamp housing taken along section line 13-13 of FIG. 12; and FIG. 14 is an end view of the clamp illustrated in FIGS. 11-13.

DESCRIPTION OF PREFERRED EMBODIMENT

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
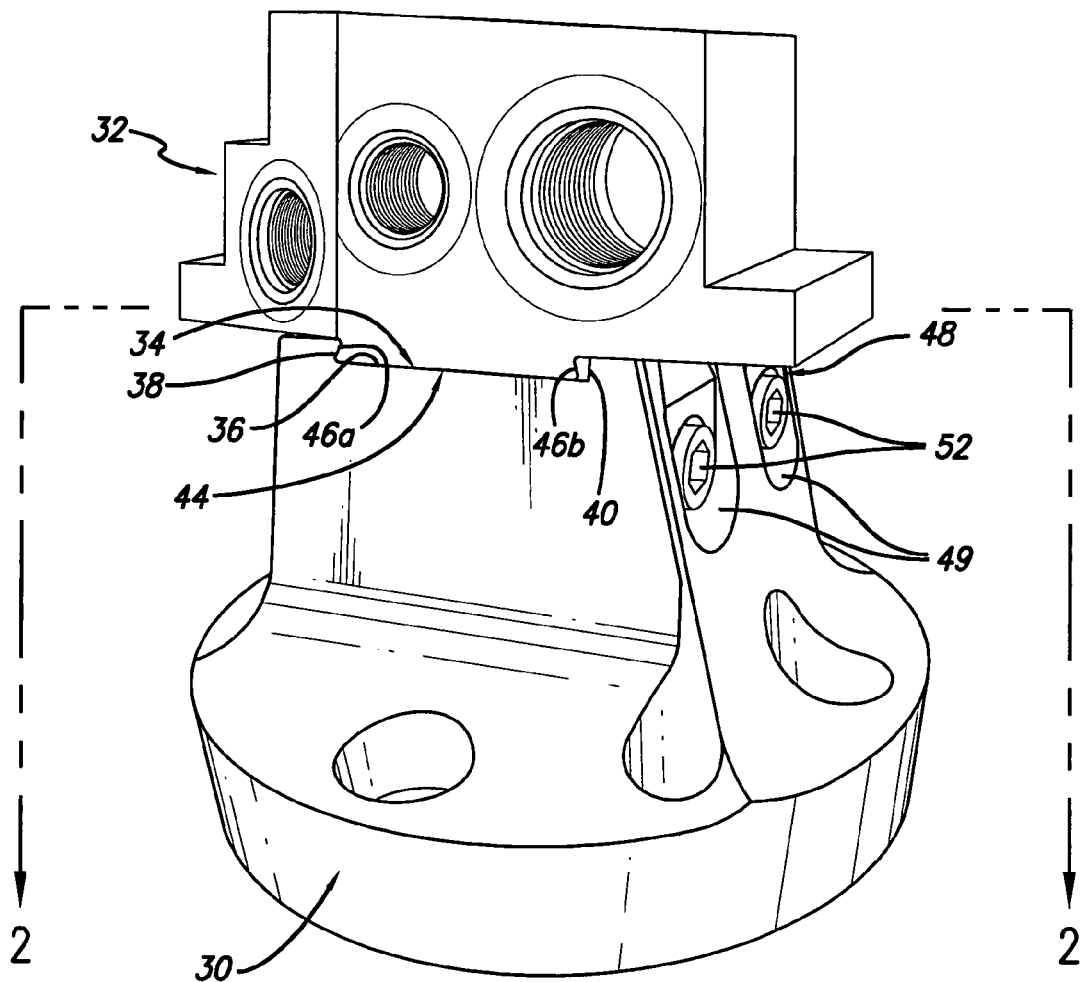
FIG. 1 is a perspective view of a workpiece secured to the work holder.
Figure 2:
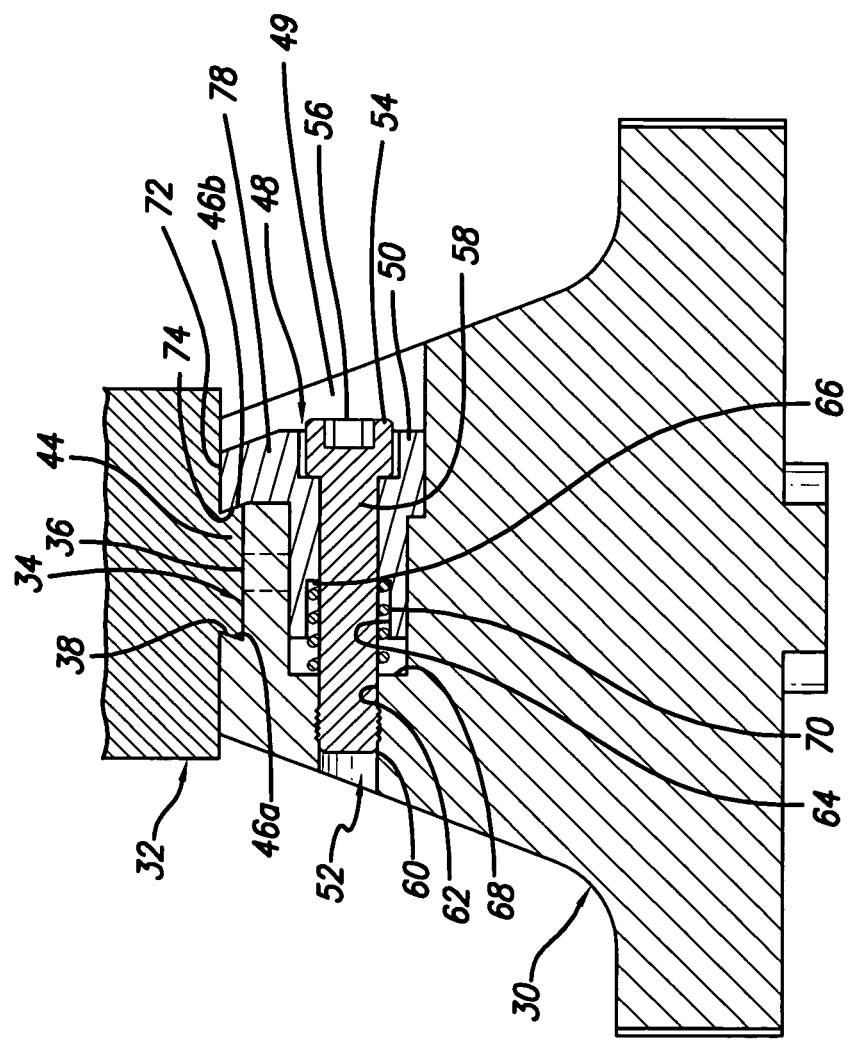
FIG. 2 is a cross-section of the mechanism taken along section line 2-2 of FIG. 1, by which the workpiece is secured to the work holder.
Figure 3:
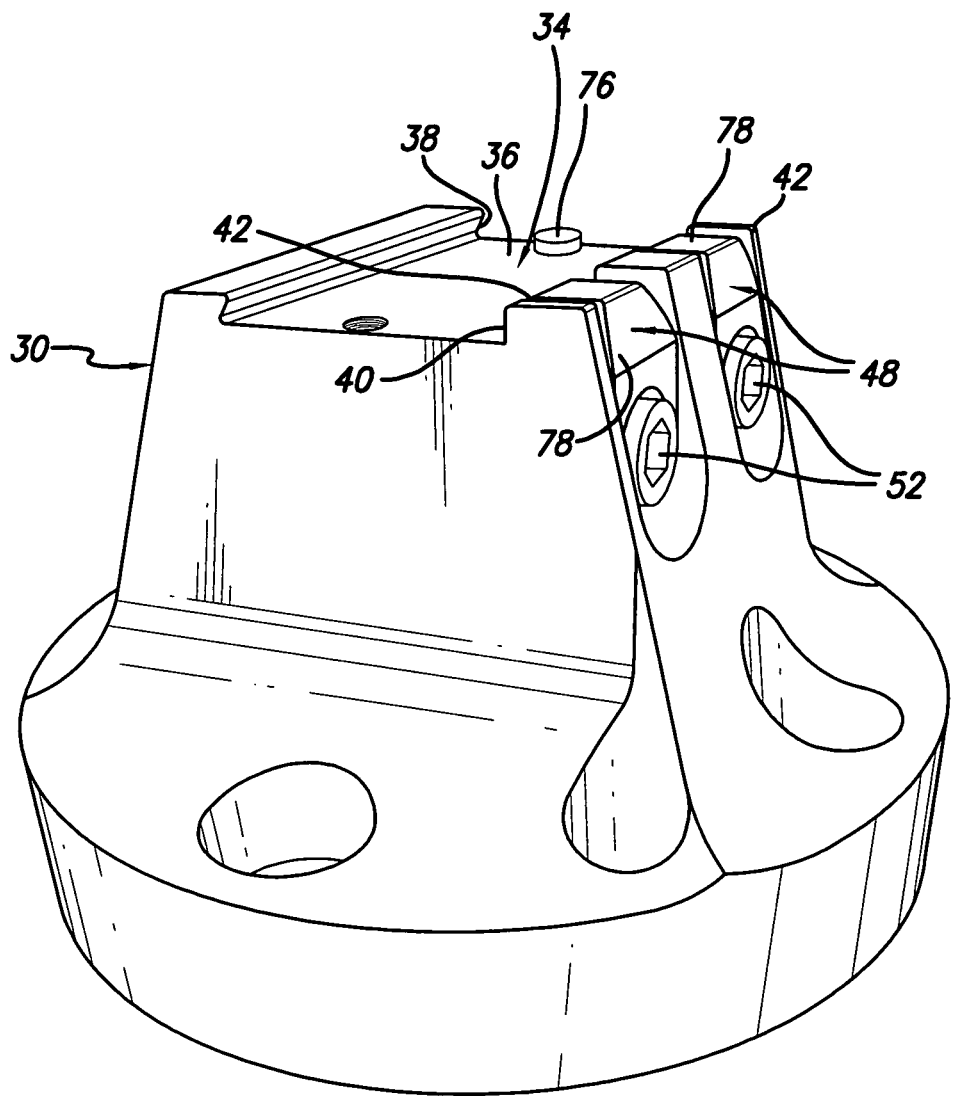
FIG. 3 depicts a perspective view of the work holder having a slot which is formed in its upper surface and which, at its opposed sides, has a slanted or dovetail side wall and a 90° trifurcated straight-up side wall.
Figure 4:
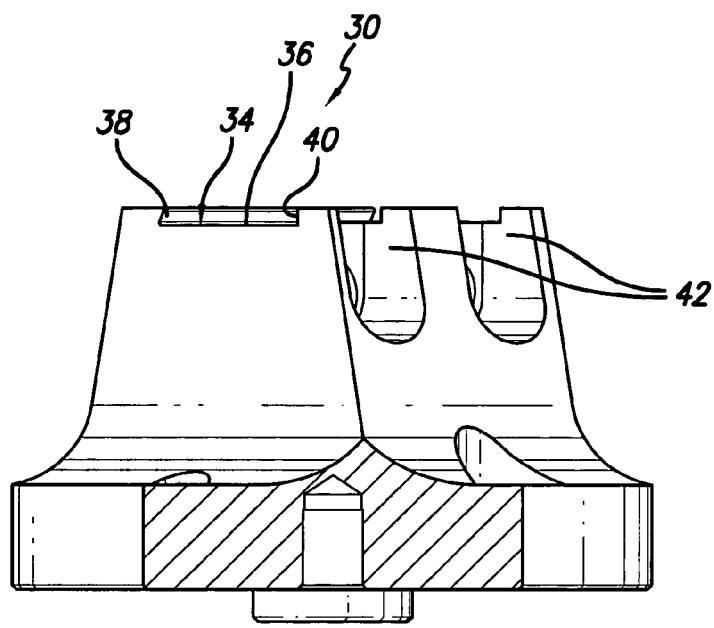
FIG. 4 is a partial cross-section of the work holder in perspective.
Figure 5:
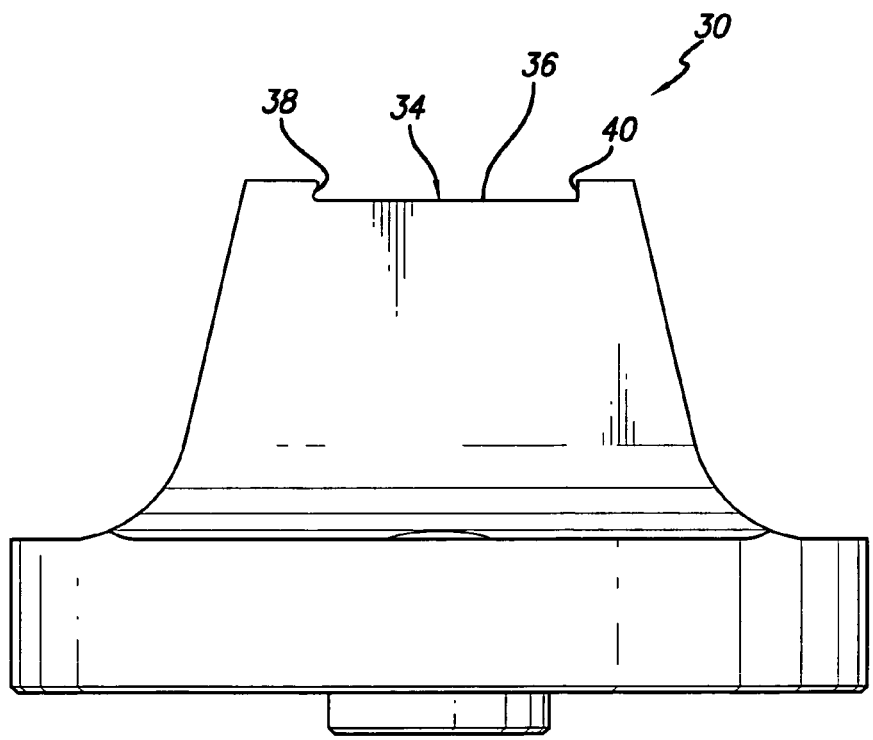
FIG. 5 is a side view of the work holder also depicting the slot with its slanted dovetail side wall and its 90° trifurcated straight-up side wall.
Figure 9:
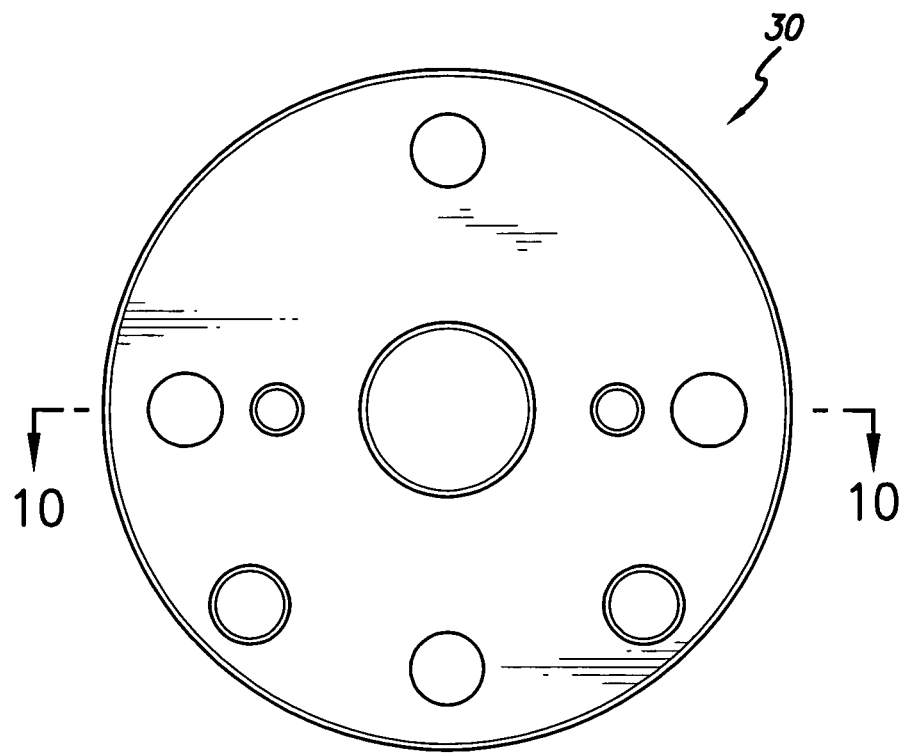
FIG. 9 is a bottom view of the work holder.
Figure 10:
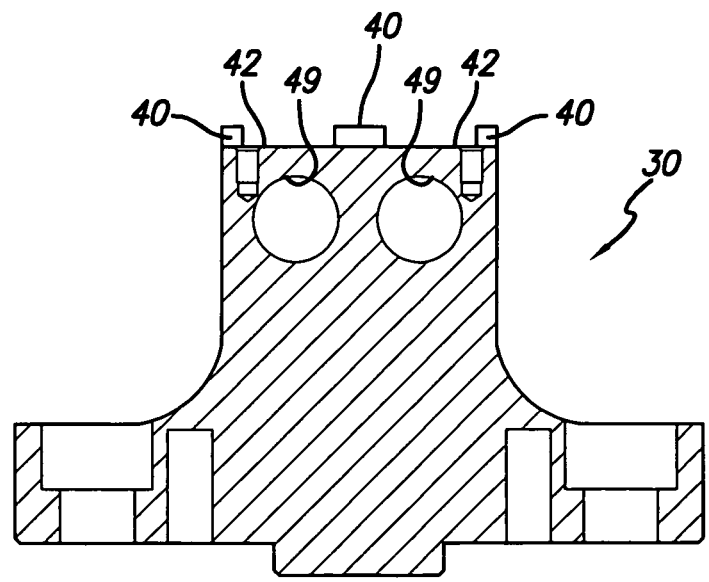
FIG. 10 is a cross-sectional view of the work holder taken along section line 10-10 of FIG. 9.

As illustrated in FIGS. 1 and 2, a work holder or support 30 is designed to firmly support, hold and grip a workpiece 32. As further shown in FIGS. 3-5 and 7, work holder is formed with a partial dovetail slot 34 having a bottom surface 36, a slanted side 38 that forms a dovetail and a trifurcated straight-up side 40, that is, side 40 is formed with a pair of openings 42. Side 38 is slanted at an angle which is less than 90° with respect to bottom surface 36 while straight-up side 40 is generally 90° to the bottom surface, although this orthogonal inclination is not critical, in that the trifurcation of side 40 (see also FIG. 6) provides openings 42 for embracing a pair of clamps, e.g., hook clamps 48. While the central section of side 40 is illustrated as wider than its outer sides, this need not be so.

Workpiece 32 is formed with an integral protuberance or projection 44 (see FIGS. 1 and 2) that is formed as shaped on the workpiece when it is fabricated. On its opposed edges, protuberance 44 is provided with a pair of dovetail sides 46a and 46b. Dovetail side 46a is disposed to contact slanted side 38 of dovetail slot 34 while dovetail side 46b is positioned adjacent to but spaced from trifurcated straight-up side 40 and openings 42 for reasons to be presently discussed also with reference to FIGS. 11-14 in conjunction specifically with FIG. 2.

Accordingly, a pair of clamps 48 (as modified from a generic form) are disposed to reside within respective bores 49 in work holder 30. Each clamp includes a housing 50 (see FIGS. 2 and 11-14) and a screw 52 having an enlarged head 54 (see also FIG. 2), in which an Allen head wrench opening 56 is disposed, and a shank 58. Shank 58 has a threaded end 60 for engagement with threaded openings 62 in work holder 30.

As best shown in FIGS. 2 and 13, clamp 50 includes a tubular stem 63, and a recess 64 is shaped in each clamp housing 50 to provide a shoulder 66. A corresponding shoulder 68, which terminates bore 49, faces clamp housing shoulder 66. Springs 70 are fitted about shank 58 of screw 50 and respectively abut at their ends against shoulders 66 and 68. Housing 50 is also provided with a head 78 at one end of tubular stem 63. An extension 72 (see FIGS. 12 and 14) extends from head 78 and includes a slanted surface 74 which is adapted to engage dovetail side 46b of workpiece protuberance 44 (see also FIG. 2). Slanted surface 74 in part differentiates clamps 48 from the generic, e.g., hook clamp form. Head 78, further has an opening 80 for retention of screw head 54 and defines a flat bearing surface 81.

In operation, as each screw 52 is threaded into threaded opening 62, against the bias of spring 70, each enlarged head 54 of each screw 52 bears against its respective surface 81 on housing 50. This movement causes slanted surfaces 74 of the respective housings to move within and to be guided by openings 42 and to engage dovetail side 46b on protuberance 44 as well as to press opposite protuberance dovetail side 46a of workpiece 32 against dovetail slanted side 38. As a consequence, protuberance 44 is affixed to work holder 30 and workpiece 32, through its protuberance 44, are secured into a fixed engagement to and within work holder 30.

A machine screw 76 (see FIG. 3) may be placed within surface 36 of slot 34 to act as a positioning stop for the workpiece.

After all machining operations are completed on the workpiece, screws 52 are unscrewed to permit the workpiece to be released from the work holder. Protuberance 44 may be then machined away and accordingly removed from the workpiece.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A device designed to firmly hold and grip a work piece formed with an integral protuberance comprising:
    a work holder formed with at least one bore and a dovetail slot; said dovetail slot having a bottom surface, a slanted side that forms a dovetail and an opposite side; said opposite side formed with at least one threaded opening; each bore having a terminal shoulder;
    a hook clamp including a housing having a tubular stem extending into the bore and an enlarged head outside the bore and a screw having a threaded shank; said threaded shank adapted to engage with the threaded opening in said work holder; said hook clamp including a recess to provide a corresponding shoulder which faces said terminal shoulder;
    a spring fitted about said shank and respectively abuts at its ends against terminal shoulder and the corresponding shoulder; and
    an extension extending from said enlarged head and including a second surface which is adapted to engage said workpiece protuberance.

2. A device as claimed in claim 1 further comprising a machine screw placed in said slot to act as a positioning stop for said workpiece.

3. A device designed to firmly hold and grip an item with a securing component associated with the item, the device comprising:
    a support provided with a surface for supporting the item, said support having a fixed part and at least one moveable part engageable with said securing component associated with the item, the support having a bore positioned adjacent to said surface the bore having a threaded end and a terminal shoulder within said bore, whereby said moveable part is adapted to engage said securing component and thus, through said securing component, to hold and grip the item to said support, the moveable part having a housing with a tubular stem positioned in the bore, a recess disposed within said stem terminating at a corresponding shoulder, the corresponding shoulder facing the terminal shoulder, a head, an extension extending from said head, and a screw having a shank with an enlarged head and a threaded end at opposed ends thereof, and
    a spring fitted about said shank and respectively abutted against the corresponding shoulder and the terminal shoulder.

4. The device according to claim 3 wherein a slanted surface is placed on said extension and said screw head is provided with a tool engagement part.

5. An apparatus for holding a workpiece, the workpiece having an integral protuberance for being grasped by the apparatus to thereby hold the workpiece in the apparatus, the apparatus comprising:
    a work holder having a face with a bore therein, the bore having a threaded opening and a terminal shoulder; and top surface with a slot therein, the slot having a bottom surface and a first side that forms a dovetail; and a clamp assembly positioned in the bore comprising:
    a housing having a tubular stem positioned in the bore, the tubular stem with a recess having a corresponding shoulder facing said terminal shoulder, an enlarged head with an extension having a second side positioned opposite the first side of the slot for engaging the workpiece protuberance between the first side of the workholder slot and the second side of the enlarged head;
    a screw extending through the tubular stem and having a threaded shank adapted to engage with threaded bore in said work holder; and
    a spring around the screw shank and extending into the tubular stem recess between the terminal shoulder and corresponding shoulder.

* * * * *